United States Patent

[11] 3,622,107

[72] Inventor Jean Paul Bernard
  Paris, France
[21] Appl. No. 840,009
[22] Filed July 8, 1969
[45] Patented Nov. 23, 1971
[73] Assignee Aerazur Constructions Aeronautiques
  Issy-les-Moulineaux, France
[32] Priority Nov. 3, 1966
[33] France
[31] 82,398
  Continuation-in-part of application Ser. No. 680,319, Nov. 3, 1967, now abandoned. This application July 8, 1969, Ser. No. 840,009

[54] AIRCRAFT STOPPING OR ARRESTING BARRIERS
  10 Claims, 7 Drawing Figs.
[52] U.S. Cl. .................................................. 244/110 C
[51] Int. Cl. .................................................. B64f 1/02
[50] Field of Search ........................................ 244/110, 63

[56] References Cited
UNITED STATES PATENTS

| | | | |
|---|---|---|---|
| 2,859,928 | 11/1958 | Snow | 244/110 |
| 2,957,657 | 10/1960 | Frieder et al. | 244/110 |
| 3,058,703 | 10/1962 | Fonden et al. | 244/110 |
| 3,128,972 | 4/1964 | Fonden et al. | 244/110 |
| 3,191,891 | 6/1965 | Fonden et al. | 244/110 |
| 3,367,608 | 2/1968 | Charno et al. | 244/110 |
| 3,093,352 | 6/1963 | Hoffstrom | 244/110 A |

Primary Examiner—Milton Buchler
Assistant Examiner—Paul E. Sauberer
Attorney—Kurt Kelman ABSTRACT: A barrier system for arresting an aircraft on a runway comprises a net barrier folded within a bag housed in a narrow trench.

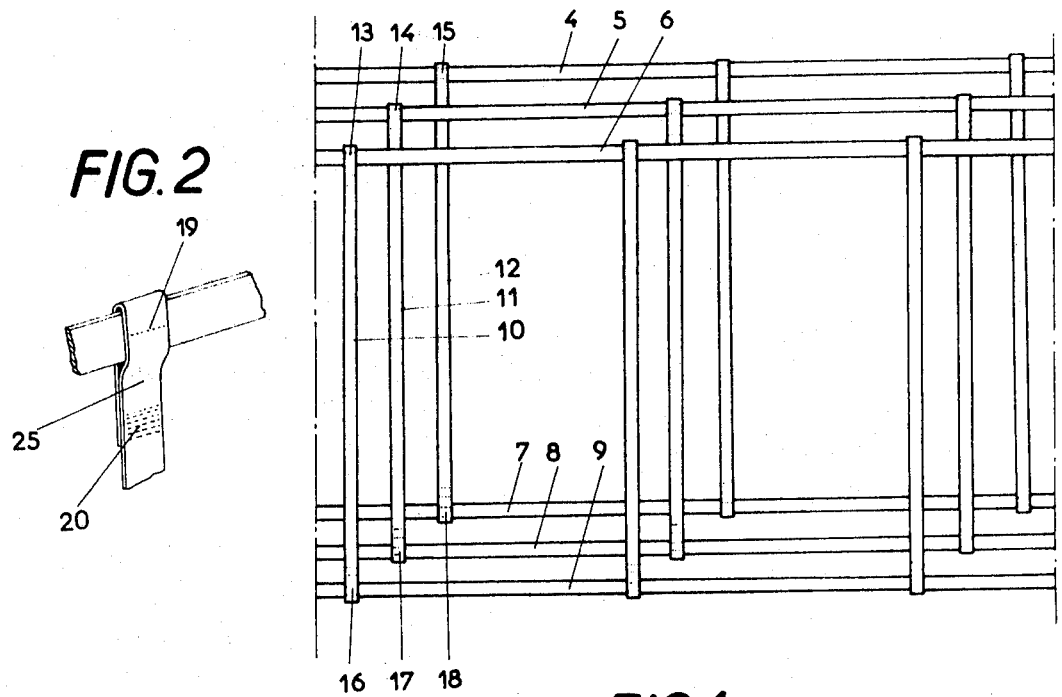

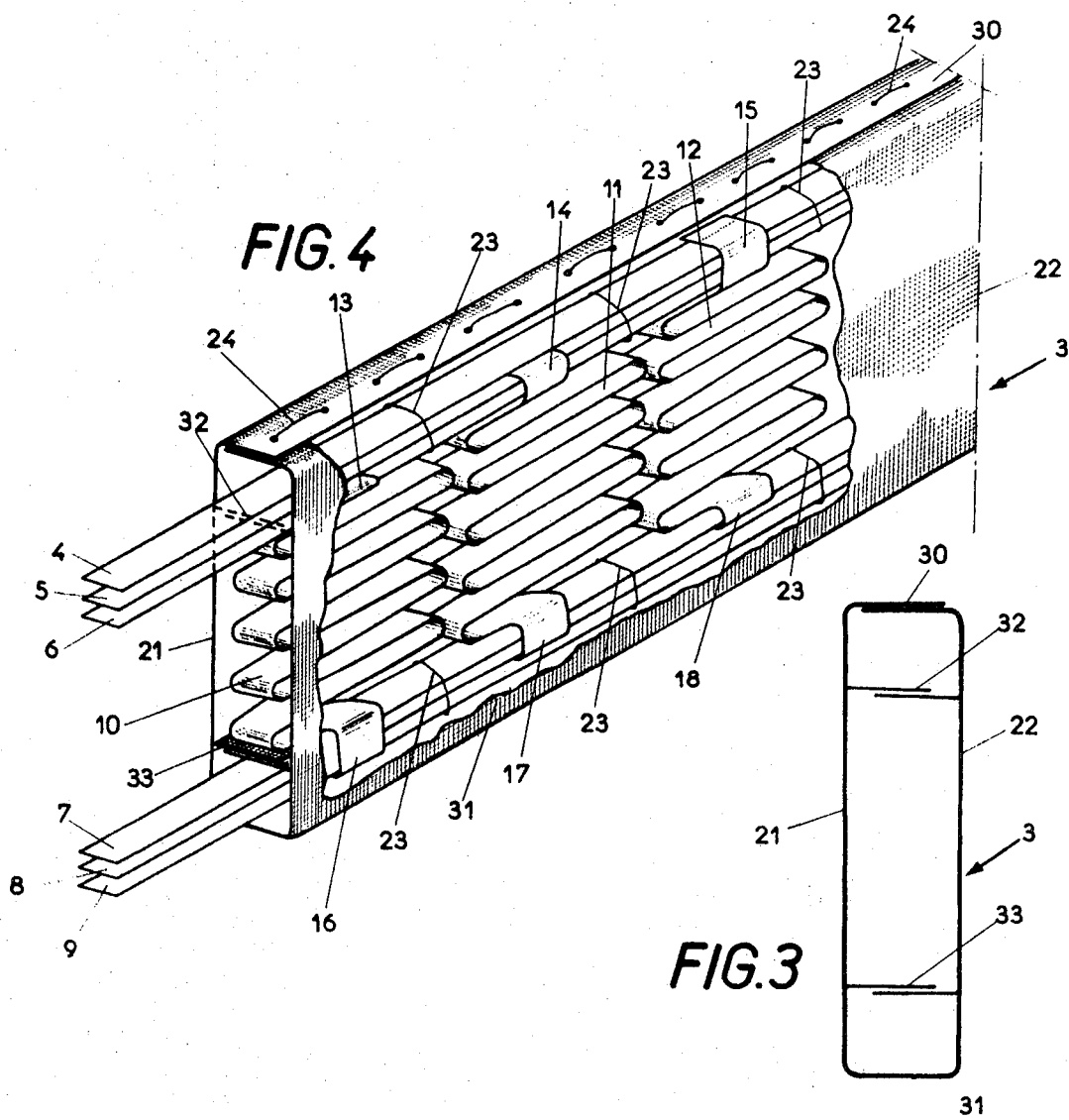

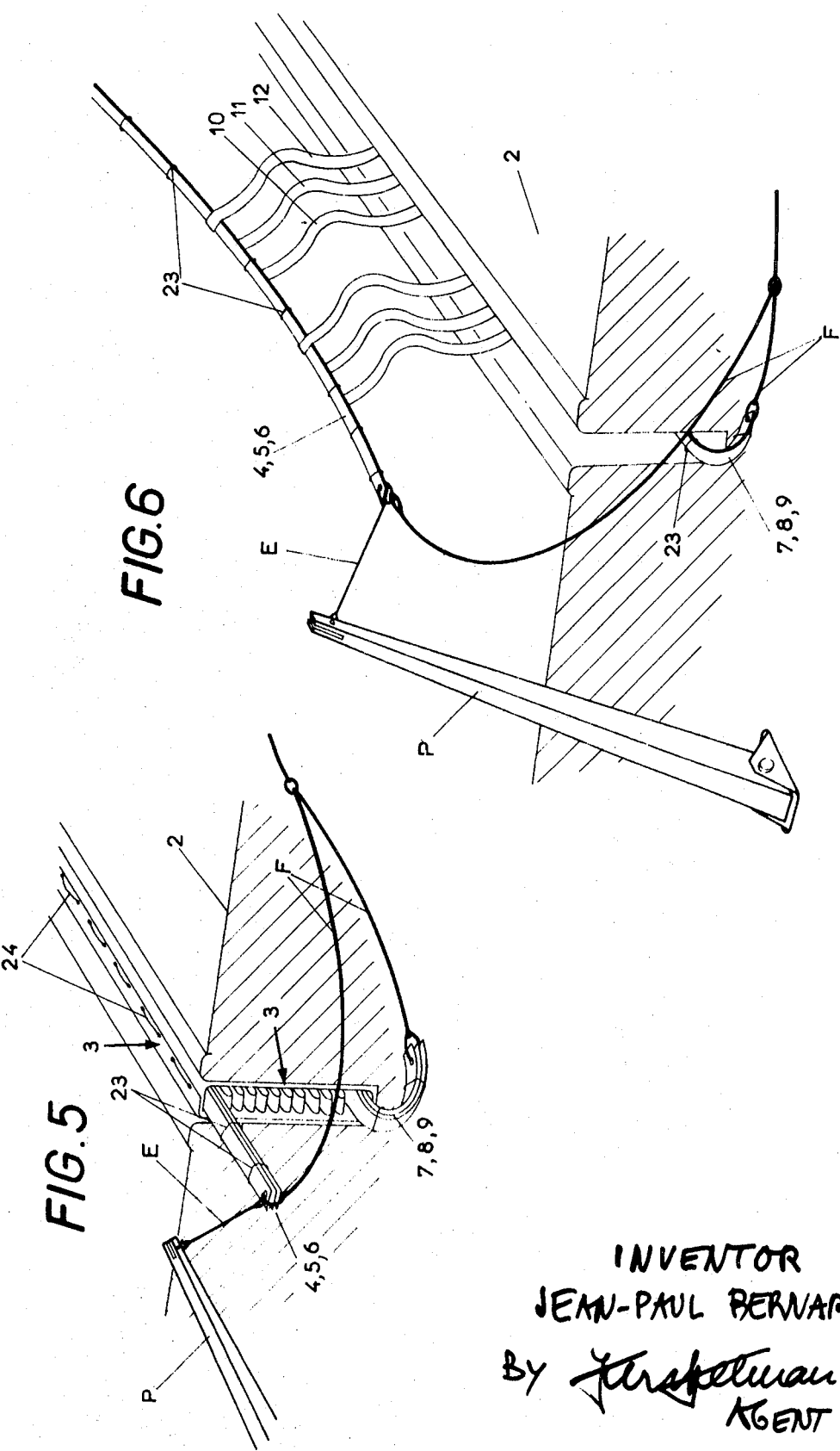

AIRCRAFT STOPPING OR ARRESTING BARRIERS

REFERENCE TO COPENDING APPLICATION

This application is a continuation-in-part of my copending application, Ser. No. 680,319, filed Nov. 3, 1967, now abandoned.

BACKGROUND AND SUMMARY OF THE INVENTION

The present invention relates to improvements in barriers for stopping or arresting an aircraft on a runway, and more particularly to means for storing such barriers on the runway.

Originally, barriers for arresting aircrafts consisted merely of a flexible strap engageable by an aircraft. However, the use of such straps was limited to small aircrafts and had the additional disadvantage of necessitating that the aircraft be provided with a device adapted to engage the strap. Later, net barriers were proposed, which obviated the necessity for strap engaging devices on the aircraft but created the problem of storing the net barrier on the runway in collapsed condition. In order to avoid a bump on the runway, it was proposed to put the net barrier into a trench arranged across the runway. HOwever, the bulk of such a net barrier required a lot of space and the trench accordingly had to have such width as require a cover.

All those barriers of the prior art and their storage on the runway present various dangers or inconveniences that the present invention proposes to remove. All the systems of the prior art are difficult to actuate and the erection of the net barrier is always difficult. The storage of the net barrier either on the runway itself or inside a trench with a cover presents risks of damaging the aircrafts and more specifically the landing-chassis and the tires. This is obvious as concerns the bumps which will be formed if the net barrier lies on the runway. In case the net barrier is inside a trench with a cover, this cover has to be rather heavy to support the weight of the aircraft; the cover, when operated, moves out of the trench and might then hit the aircraft. Besides, the net barrier, either when it lies on the runway or when it bursts out of the trench after the cover has been opened, may be seriously damaged. Furthermore, the operation of the net barrier may be considerably impeded under freezing conditions. All those net barriers raise problems in transportation or the replacement of the barrier since, once a barrier has been used, it is always difficult and time consuming to replace the same by either spreading the barrier on the runway or by placing the net barrier into the trench. Finally, the barriers are limited in size and, therefore, usable only with small aircrafts since the bulge formed by the barrier lying across the runway or the volume of the barrier to be stored in bulk in the trench has to be as small as possible.

The invention has, therefore, for one of its objects to provide a barrier which is completely retractable so that the barrier cannot be damaged and cannot damage the aircraft.

Another object of the invention is to provide a very narrow trench which is adapted to receive the barrier and requires no cover, avoiding thereby the possibility for the cover to damage the aircraft or the barrier.

Still another object of the invention is to provide a bag in which the barrier is placed folded for easy storage replacement and convenient transportation of the barrier.

Still another object of the invention is to provide such retractable barriers without limitation of size to small aircrafts.

Still another object of the invention is to provide a retractable barrier easy to actuate and to operate even under freezing conditions.

BRIEF DESCRIPTION OF DRAWING

These and other objects, features and advantages of the present invention will be disclosed more fully in the following description in conjunction with the accompanying drawing, in which:

FIG. 1 is a schematic partial plan view of the net barrier before folding, showing the component straps of the same.

FIG. 2 is a detail view showing the connection between the vertical straps and the horizontal straps of the net barrier.

FIG. 3 is a cross section view of the bag adapted to contain the net barrier.

FIG. 4 is a schematic perspective view of one end of the bag, a portion of the bag wall being broken away to show the folded net barrier positioned inside.

FIG. 5 is a perspective partial view of the runway showing the positioning of the bag with the net barrier inside the trench and the connections of the net barrier to the poles and the brake-cables.

FIG. 6 is a perspective partial view of the net barrier when being spread up upon actuation of the poles.

DETAILED DESCRIPTION

Figure 7:
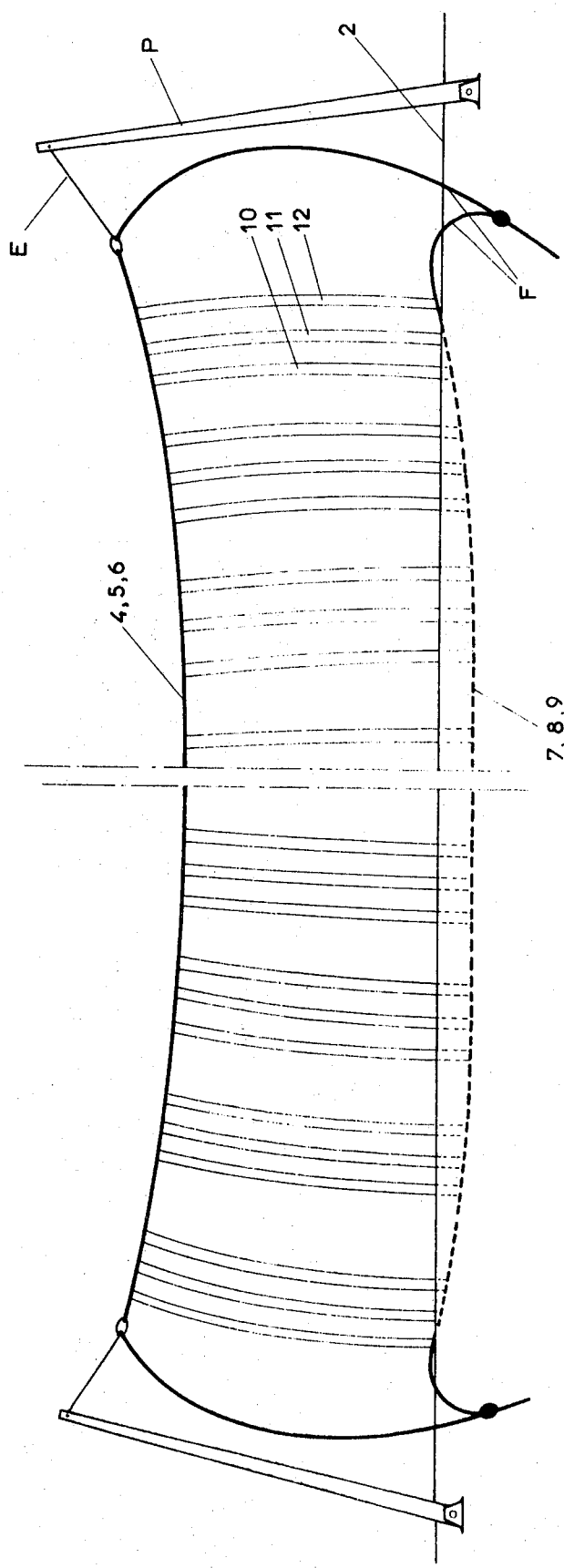
FIG. 7 is a schematic front elevational view of the spread net barrier just before the impact of the aircraft.

The net barriers are generally of the compound type and consist of a series of individual net barriers, such as disclosed in U.S. Pat. No. 3,069,118. Such a net barrier has been schematically represented in Fig. 1. For facilitating the description, only three individual net barriers have been shown but it will be understood that, for obtaining good results, many more such individual barriers are generally necessary. As shown in Fig. 1, each barrier consists of upper horizontal straps 4, 5 and 6, lower horizontal straps 7, 8 and 9 and several series of vertical straps 10, 11, 12.

The vertical straps are assembled with the two nets of horizontal straps as shown in Fig. 2. The vertical strap is provided with a loop which encircles the horizontal strap. The loop is fastened by seam 20. Additionally, the horizontal strap is attached to the vertical strap by stitching at 19. Between seam 20 and stitching 19, there is a depressed area 25 where the vertical strap may be folded, as disclosed hereinafter.

In Fig. 3, a cross sectional view of bag 3 is shown. This bag is, in this example, parallelepiped. It consists of two side walls 21 and 22, a bottom wall 31 and top wall 30 consisting of two flaps. Inside the bag, several sets of flaps are provided to operate a cross-braces, two cross-braces 32 and 33 being shown in this preferred embodiment. The lower horizontal straps are stacked between the bottom 31 and the cross brace 33; then the vertical straps are stacked; and the upper horizontal straps are stacked between cross brace 32 and top wall 30. The cross-braces and top wall 30 are all formed of at least two flaps which are assembled either by a breakable thread, or by a stitching strip capable of being unstitched or by two adhesive tapes, such as those known under trademark "Velcro" which cooperate to close the bag. The purpose of the cross-braces is to prevent the bag, when loaded, from rolling up.

In Fig. 4, wall 22 and part of wall 30 have been broken away to show the folding of the net barrier in the bag. The folding may take place either at the factory where such net barriers are manufactured and assembled, or after use of the net barriers, on the runway. Lower horizontal straps 7, 8, 9 are stacked one above the other inside the bag; they are then fastened together with breakable threads 23 so as to constitute a rather thin band. Then cross brace 33 is positioned above the straps and closed, as shown in FIG. 3. Horizontal straps 7, 8 and 9 project outside of the bag at the end thereof in order to be connected, as will be described in connection with Figs. 5 and 6. It will be seen also that the loops 16, 17 and 18 whereby the vertical straps are attached to the horizontal straps protrude from the band consisting of the assembled horizontal straps 7, 8 and 9. The lower horizontal straps being in position, the loops 16, 17 and 18 of the vertical straps 10, 11 and 12 are folded by first turning the vertical straps by 90° to align the same parallel to the horizontal straps. The loops are folded in the depressed area 25 between the stitch 19 and the seam 20. This folding operation takes place in two steps: first the vertical strap is folded perpendicularly with respect to the horizontal strap and then the vertical strap is folded again obliquely to draw it back parallel to and above the horizontal straps. Then each one of the vertical straps 10, 11 and 12 is parallel to the horizontal straps and it is sufficient to fold them in a zigzag manner back and forth to stack the vertical straps in good order, as shown in FIG. 4.

When the folding and the stacking operation is terminated with respect to the vertical straps, there remain the loops 13, 14 and 15. These loops are then folded in the same manner as loops 16, 17 and 18, a second cross-brace 32 is placed in position and the upper horizontal straps 4, 5 and 6 are stacked one above the other to form a rather thin band which is fastened with breakable thread 23.

Then the two flaps of the cover 30 are joined together by a breakable thread 24 to maintain the bag in closed condition.

This folding method permits to stack large size net barriers within a very restricted volume. In other words, the invention permits to have at the same time a large net barrier and a very narrow trench storing the same, thus avoiding the necessity for a cover member.

In Fig. 5, the aircraft arresting system is shown ready for use. A narrow trench is arranged across the runway 2. The bag 3 with the net barrier is positioned inside the trench. The plurality of upper horizontal straps 4, 5, 6, on the one hand, and the plurality of lower horizontal straps 7, 8, 9, on the other hand, protrude from the ends of the bag and out of the trench.

The upper horizontal straps 4, 5 and 6 are connected to pole P by a cord E. The two horizontal strap assemblies 4, 5, 6 and 7, 8, 9 are connected to the brakes (not shown) by cables F.

In Figs 6 and 7 the operation of the net barrier system has been shown. When an aircraft is to be arrested on a runway, the poles P are actuated from a collapsed position on the ground into a raised position. This lifting movement of the poles drags along the upper horizontal straps 4, 5, 6 by means of cord E and this causes the threads 24 to be broken. The upper horizontal straps 4, 5, 6 still fastened by breakable threads 23 burst out of the bag and, after the cross-brace 32 has been opened, drag along the vertical straps 10, 11, 12 which are extended while cross-brace 33 and the lower horizontal straps 7, 8, 9 which are not connected to cord E remain inside bag 3. This step of the operation has been shown in Fig. 7. The net barrier is shown schematically on this figure, as it may be seen by the pilot of the aircraft which is going to engage the barrier.

When the aircraft engages the barrier, cords E may break so as not to damage the poles, after cross-brace 33 has been opened, and the lower horizontal straps 7, 8, 9 burst out of the trench. The upper and lower horizontal straps thereupon pull apart, breaking the threads 23. The aircraft then engages the barrier fully and is harnessed in the net barrier. The brakes connected to the barrier by cables F now operate and bring the aircraft to a stop. The bag 3 remains inside the trench.

In a preferred embodiment, the net barrier is around 100 meters long and 8 meters high; it consists of straps which are 3 centimeters wide and 3 millimeters thick. The vertical straps are about 8 meters high and the horizontal straps are from 80 to 100 meters long. The fastened band resulting from the assembly of horizontal straps is about 18 centimeters thick. The order of magnitude for the width of the trench is 4 centimeters. The bag can be 80 meters long, 3 or 4 centimeters wide and 40 centimeters high. It should be noted that the vertical straps may also be fastened by breakable threads into bundles but those bundles will be pulled apart under the lifting action of the poles P. The breakable threads 23 and 24 have a tensile strength in the range of 25 kilograms.

It will be understood that the examples particularly described above are not intended to limit this invention. Various modifications of the additions to the arrangements described are possible without exceeding the scope of the invention.

I claim:

1. A barrier system for arresting an aircraft on a runway, which system comprises a narrow trench in and across the runway, a bag housed in the narrow trench, and a net barrier consisting of a plurality of upper and lower horizontal straps and a plurality of verticals straps, the net barrier being folded within the bag.

2. The barrier system of claim 1, 1, further comprising actuating poles operatively connected to the upper horizontal straps for pulling the upper horizontal straps out of the bag and the trench upon actuation of the poles, and cables connected to the upper and lower horizontal straps and anchoring the same.

3. The barrier system of claim 1, wherein the narrow trench has a width of the order of magnitude of several centimeters.

4. The barrier system of claim 2, wherein the cables connect the straps to brakes.

5. The barrier system of claim 2, further comprising cords connecting the upper horizontal straps to the poles.

6. The barrier system of claim 1, wherein the bag comprises an openable top wall consisting of at least one flap.

7. The barrier system of claim 5, wherein the bag comprises, in the inside thereof, at least one cross-brace consisting of at least one flap openable under pull.

8. The barrier system of claim 6, further comprising breakable adhesive strips closing the flaps.

9. The barrier system of claim 6, further comprising breakable threads closing the flaps.

10. The barrier system of claim 6, further comprising a stitching strip closing the flaps and capable of being readily unstitched.

* * * * *